United States Patent [19]

Birlmeier

[11] 4,092,489
[45] May 30, 1978

[54] SWITCHING ARRANGEMENT FOR MONITORING POLARITY REVERSAL ON LINES IN TELECOMMUNICATION SYSTEMS

[75] Inventor: Josef Birlmeier, Deisenhofen, Germany

[73] Assignee: Siemens Aktiengesellschaft, Munich, Germany

[21] Appl. No.: 782,772

[22] Filed: Mar. 30, 1977

[30] Foreign Application Priority Data
Mar. 30, 1976 Germany .............................. 2613590

[51] Int. Cl.² ........................ H04L 15/00; H03K 5/20
[52] U.S. Cl. ....................................... 178/3; 307/236; 328/118
[58] Field of Search ......................... 307/236; 328/118; 178/2 R, 3, 68, 69 G; 179/18 FA, 18 F, 84 R

[56] References Cited
U.S. PATENT DOCUMENTS

| | | | |
|---|---|---|---|
| 3,509,474 | 4/1970 | Arnold et al. | 328/118 |
| 3,697,782 | 10/1972 | Matouka | 328/118 |
| 3,894,288 | 7/1975 | Musser, Jr. | 328/118 |
| 3,916,326 | 10/1975 | Woyton | 307/236 |

*Primary Examiner*—Thomas A. Robinson
*Attorney, Agent, or Firm*—Schuyler, Birch, Swindler, McKie & Beckett

[57] ABSTRACT

Apparatus is described for monitoring the state, e.g., with regard to polarity, of signal lines in a telecommunication system. An input circuit, by means of high resistances relative to the line resistance, connects the lines to a differential amplifier having a predetermined threshold of response. A component of the amplifier output is applied to the input so as to have a polarity opposite to that of a bias voltage coupled to the amplifier. A capacitive protective circuit connected between the signal lines provides a time delay thereby protecting against interference pulses.

3 Claims, 2 Drawing Figures

SWITCHING ARRANGEMENT FOR MONITORING POLARITY REVERSAL ON LINES IN TELECOMMUNICATION SYSTEMS

BACKGROUND OF THE INVENTION

This invention relates to switching apparatus for monitoring changes in signal status, i.e., changes in polarity, occurring on signaling lines of a telecommunications system.

To evaluate the switching condition of signaling wires and of subscriber lines and interexchange trunks, it is a common technique to employ relays which, in response to changes of the signaling condition of the particular line in question, change their states of excitation and contact positions. The relays must now, however, pick up in response to the occurrence of permissible interference voltages or shunt currents. Such relays are difficult to use, however, because they cannot be designed to be suitable for every operating condition. The uncertainty in using relays for this purpose is at its greatest when large interference voltages and line resistances are encountered. The same is true with the conventional use of magnetic cores, the control windings of which are affected by the current to be measured.

In another arrangement of known construction the evaluation means is connected between the resistances of a voltage divider comprising two resistors and forming a bridge circuit. This produces independence from noise and supply voltage variations.

In another circuit for supervising a subscriber line, both signaling wires are routed through summing resistances to the input of a monitoring amplifier, one wire is connected directly to the amplifier, and the other wire is connected by way of a phase inverter stage. This arrangement is so designed that if currents flow in both wires that are equivalent in magnitude and direction, mutual compensation of the corresponding potential variations occurs at the input of the amplifier. If a counter-current flow is produced through the closed subscriber loop, a potential shift occurs at the input of the monitoring amplifier, and this then produces an appropriate signaling.

To determine the status of a subscriber line, it is also common practice to use a differential amplifier connected having inputs end connected to the taps of two voltage dividers which are linked and which are in turn connected to the line being supervised. This amplifier generates an output signal indicating the status of the supervised line as a function of the potential difference between the taps of these voltage dividers. By means of a bias resistor, it is ensured that the potential difference between these taps corresponds to a prespecified minimum value. The circuit is designed such that in response to a change of the switching condition of the subscriber line the relative polarities at these circuit points intended for the tap undergo a reversal.

It is, therefore, an object of the invention to provide a line monitoring means which easily adapts to variable conditions, and at the same time, is capable of acting to prevent the influence of noise components during the evaluation, to extend maximum protection against destruction by atmospheric discharges and shock-hazard voltages and to perform these functions with the greatest possible reliability.

SUMMARY OF THE INVENTION

The above and other objects are achieved in accordance with the invention in that a differential amplifier is employed wherein there is returned to the input circuit from the output signal of the differential amplifier a voltage component having a direction opposite to that of the bias. The inputs of the differential amplifier are each connected to the line circuit via a resistance comprising two component resistances; the resistance is of high impedance value in relation to the line resistance. For the protection of the signals there is connected to the selection line an arrangement comprising a series connection of a capacitor parallel with the main current path of a transistor and a diode parallel with the control current path of the transistor and enabling the charging and discharging process.

This monitoring means may be used both for symmetrical and asymmetrical signaling. Owing to the threshold setting, protection is extended against continuous interference voltages in the case of a line that does not carry signals as high as the magnitude of the volt efficiency, and due to the lowering of this threshold, carried out with the response of the monitoring means, protection is extended against such continuous interference voltages during the signaling. The release threshold to be preassigned through this hysteresis setting can then be predetermined at a correspondingly low value in relation to the continuous interference voltages to be expected during the signaling.

Interference pulses in any number and sequence and having amplitudes that exceed the prespecified threshold values can be eliminated with the aid of the transistor-diode-capacitor combination through an appropriate time lag. In this way, interference pulses of the signals to be transmitted and further processed remove at the same time the effects of distortion-produced interference.

The effect of the transistor-diode combination in conjunction with the network and the capacitor results in a protection against surge voltages of any random polarity such as may be caused by strokes of lightning. The resistors disposed in the selection line of the operational amplifier also contribute to the immunity to surge voltages. This effect may also be strengthened by an appropriate design of these resistors.

In addition to a predetermined elimination of interferences, one can also restore to its original length an interference-prone signal recognized as a useful pulse via a value-type selection of a resistance disposed in the main current path of the transistor.

With the aid of the arrangement designed in accordance with the teachings of the invention, optimum flexibility in the selection of the response thresholds and delay times can be achieved in addition to great protection against surge voltages and overvoltages. Thus, all the conditions required for distinguishing useful from interference signals can be satisfied with the possibility of simultaneous adaptation to variable conditions.

In principle, it is also possible to use the arrangement according to the invention not only in DC signaling systems but, in modified form, also in AC signaling systems.

In accordance with a further development of the invention, both inputs of the differential amplifier are connected by resistances subdivided into a maximum of two component resistances, the common junction point of which is connected to a fixed reference potential in dependence on the polarity achieved in relation to the inputs of the differential amplifier and on the supply voltage thereof. The generation of the bias and that of the voltage component opposite thereto occurs by means of at least one voltage divider containing the resistances.

The arrangement comprising transistor, diode and capacitor may be connected between the reference potential selected for the common junction point and the junction point of the resistances disposed in the selection line or between the two junction points of these resistances. It is therefore possible, in principle, to preassign any desired response or turnoff protective period within precisely defined limits. Hence, a distorted or interference-prone signal can be corrected and restored to its original length.

BRIEF DESCRIPTION OF THE DRAWINGS

The principles of the invention will be more readily understood by reference to the detailed description of alternate preferred embodiments given below and in conjunction with the drawings which are briefly described as follows.

DETAILED DESCRIPTION OF THE PREFERRED EMBODIMENTS

Figure 1:
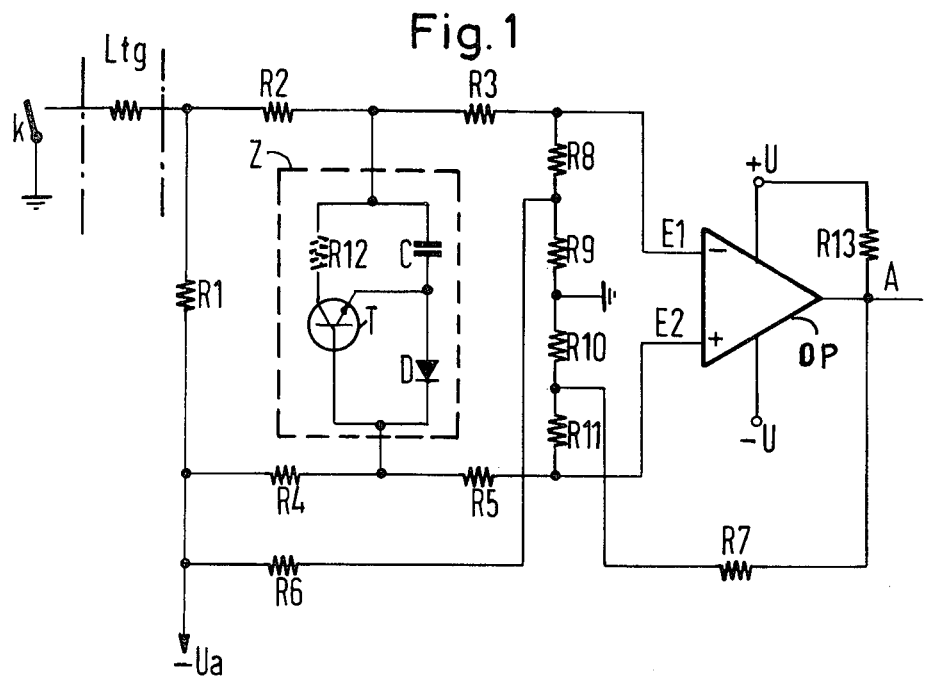
FIG. 1 is a schematic diagram of a switching arrangement for monitoring asymmetrical signaling.

In the practical example in FIG. 1, pulses with a given minimum duration are monitored. The pulses are produced by asymmetrical signaling, for example, by operating contact k with a line marked Ltg and having a given resistance. During the signaling, an appropriate voltage drop occurs across the resistor R1 connected, e.g., to the negative terminal of the supply voltage generator. The monitored result will not be influenced by neighboring continuous interference voltages, voltage breakdowns of predetermined magnitude and interference pulses with shorter duration than the useful pulses.

Both inputs E1 and E2 of operational amplifier OP, which evaluates only the difference between the voltages applied thereto, are connected by resistances R8, R9 and R10 and R11 to a fixed reference potential (in the practical example, ground potential). The junction point of resistances R8 and R9 is connected by resistance R6 to the negative terminal of supply voltage generator UA, and the junction point of resistances R10 and R11 is connected by resistance R7 for feedback from output A of the operational amplifier. A prespecified bias can be established with resistance R6 using the first-mentioned voltage divider for the operational amplifier, so that continuous interference voltages of values below the preassigned threshold can have no deleterious effect. After response of the amplifier, the threshold is lowered using resistance R7 connected to the output of the operational amplifier, since the voltage drop across resistance R10 is in the opposite direction of the prescribed threshold voltage. Thus, breakdowns that are caused, for example, by continuous interference voltages during the signaling cannot affect the output signal. In this way, due to this hysteresis setting, protection is extended against unwanted turnoff of the energized operational amplifier. By varying the resistance R7, any desired turnoff threshold can be selected. Thus, the operational amplifier blocks only if the input voltage is lowered below this newly formed threshold.

Resistance R13 connected to output A over the positive terminal of the supply voltage of the operational amplifier serves the purpose of avoiding unspecified voltage ratios across the output.

Because of series resistance combinations R2 and R3 and R4 and R5, respectively, disposed in the selection lines, immunity to surges and overvoltages is ensured. This is dependent on the choice of the order of magnitude of these resistances. A capacitor C connected between the junction points of these resistances by means of additional switching elements produces a time delay defined by the value of the capacitance of this capacitor. Thus, interference pulses exceeding the values predetermined by the threshold voltages under consideration can be removed.

When the switching arrangement is in the idle condition, the bias defined by resistance R6 is applied to input E1 of the operational amplifier. If for purposes of signaling, contact k is closed, e.g., by the line which, for example, may be a control wire of a telephone system, the capacitor is charged via the circuits connected in parallel to one another, i.e., via ground, resistance R2 and ground, resistances R9, R8 and R3 and via diode D and the resistance R4 connected to the negative terminal of the supply voltage. Depending on the charge condition of the capacitor, the voltage across input E1 of the operational amplifier increases in a positive direction. The operational amplifier responds when the threshold voltage set across this input is attained and applies negative supply voltage U to output A. This voltage transient can then be processed further by subsequent equipment.

If contact K opens before the voltage across the capacitor reaches the prescribed threshold, the capacitor is discharged by applying impulses across transistor T, because the overall capacitor voltage across the diode is available as a control voltage for the transistor, if resistance R12 equals zero. This results immediately in a new protective period defined by the time until the threshold voltage is reached. Thus, interference pulses applied outside of the actual signaling can be removed. If the reduction of the useful pulse caused by this cancellation of interferences is not desired, then either a pulse regeneration or a pulse extension can be carried out by turning on a properly valued resistor R12. In the first instance, an interruption of a pulse entering over the line is only ascertained at the end of the existing protective period, so that the pulse is retransmitted in its original length without distortion, to the equipment following the output A. The resistance may also be chosen such that after response of the operational amplifier, pulse interruptions lasting longer than the stated protective period are bridged, so that pulse extension can be achieved.

Due to the placement of the operational amplifier arrangement between the two selection lines, protection is extended against overvoltages, since a diode path is always opened for surge voltages with a positive or negative direction.

A circuit variant for achieving a release protective period is obtained by connecting the arrangement to the common junction point of the resistances disposed in a selection line and to the reference potential. If this arrangement lies between the junction point of resistances R2 and R3 and ground potential, in the absence of resistance R12, then each edge exceeding the predetermined response threshold is converted to a minimum pulse of prescribed duration. Accordingly, interruptions of a useful pulse within this period are not evaluated. Depending on the choice of resistance R12, a response protective period can also be achieved, in which case interruptions of the evaluated useful pulse that are of shorter duration than the protective period are bridged.

Figure 2:
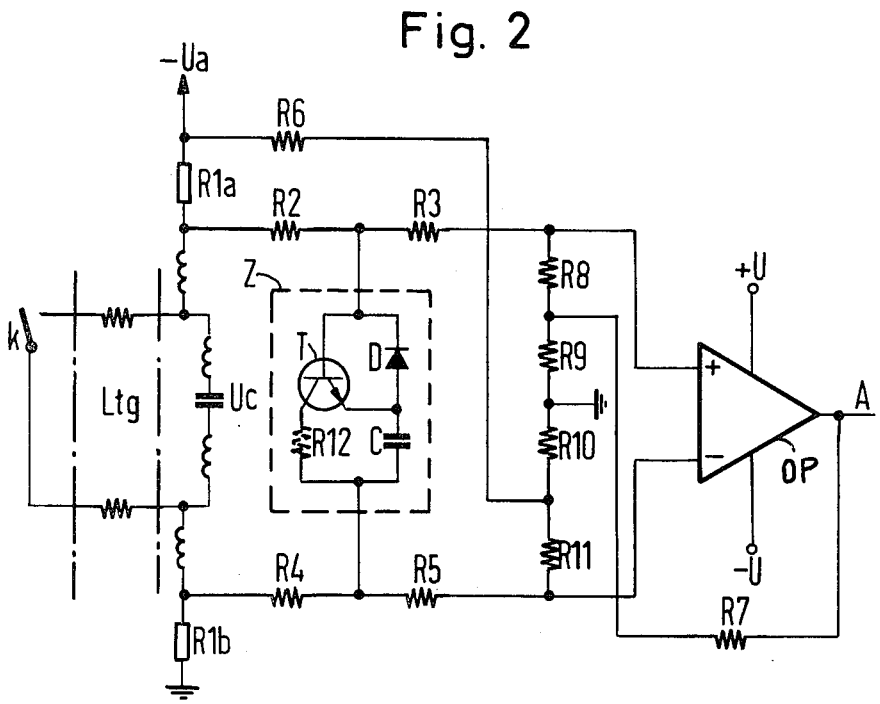
FIG. 2 is a schematic diagram of a switching arrangement for monitoring symmetrical signaling.

FIG. 2 illustrates an alternate embodiment constructed for symmetrical signaling. In this figure, reference designations like those in FIG. 1 denote like parts.

The circuit inverts the input signal and forms each pulse so as to pass the static and dynamic interference removal to a no-current period of prescribed duration. Again, the response threshold voltage can be set by the resistance R6 connected to the negative terminal of supply voltage generator Ua, and the turnoff threshold prevailing after response of the operational amplifier can be set by resistance R7 connected to output A of the operational amplifier in conjunction with R6. The supply voltage of the operational amplifier is marked U. Line Ltg terminating in line repeater Uc may, for example, be formed by the tip and ring wires of a telephone system.

The signaling on such a line generally occurs through predetermined variations of the loop current. As an example, upon removal of the handset of a telephone instrument, the loop resistance is changed from a very high resistance to a low one corresponding to the resistance of the closed loop. For dial pulsing, the resistance of the loop for each dial pulse, for instance, is brought to this high resistance corresponding to the insulation or leakage resistance in the case of an open loop. Various resistances may also be cut into the loop for dial pulsing. In this example, signaling over the line is carried out by operating the contact k. The operational amplifier connected by the loop current for in-phase operation in response to the closing of this contact is turned off by the threshold which is predetermined via R6 and lowered via R7. The turnoff threshold in conjunction with the transistor-diode-capacitor combination prevents doubling or multiplying of the output signal during contact bounce, oscillating processes on the line, clicks or brief interruptions.

After turning off the operational amplifier, the response threshold again jumps to the original value defined by resistor R6. Output A of the operational amplifier again carries voltage after the opening of contact k.

The switching arrangement in accordance with the invention for monitoring the condition of a line is suitable for permanent connection to the line. If there is no need for continually indicating the line condition, the apparatus of the invention may be temporarily connected for monitoring within a stated time interval.

The principles of the invention are described hereinabove by describing the construction and operation of embodiments for applying these principles, respectively, to asymmetrical and symmetrical signaling conditions. The described embodiments are to be considered as being exemplary, and it is contemplated that obvious modifications to or changes in them will be within the scope of the invention as defined by the appended claims.

I claim:

1. Apparatus for monitoring changes in polarity during signaling on signal lines in a telecommunications system, comprising:
    differential amplifier means having a predetermined response threshold,
    input circuit means connected to the input terminals of said differential amplifier,
    connecting means having a higher valued impedance relative to said signal lines for connecting said input circuit means to said signal lines,
    bias means for applying a bias voltage to said differential amplifier through said input circuit means,
    feedback circuit means connecting an output of said differential amplifier to said input circuit means for coupling thereto an output voltage component having a polarity opposite to that of said bias voltage and
    protective circuit means comprising a capacitor and switching means for controlling the charging and discharging of said capacitor, said protective circuit means being connected between said signal lines at said connecting means.

2. The apparatus defined in claim 1 wherein said input circuit means comprises:
    a plurality of series-connected resistances connected between the two input terminals of said differential amplifier, a first junction point between two of said resistances being connected to a reference potential, said bias means being connected to a second junction point between another two of said resistances and said feedback circuit means being connected to a third junction point between a further two of said resistances.

3. The apparatus defined in claim 1 wherein said connecting means comprises two pairs of series-connected resistances, each pair being connected respectively, in series with a signal, said protective circuit means being connected between the junction points in each pair of series-connected resistances.

* * * * *